US006198565B1

United States Patent
Iseki et al.

(10) Patent No.: US 6,198,565 B1
(45) Date of Patent: Mar. 6, 2001

(54) LIGHT DEFLECTION ELEMENT AND DISPLAY APPARATUS USING SAME

(75) Inventors: Takayuki Iseki; Shingo Yagyu; Katsuhiko Oguri, all of Kanagawa-ken (JP)

(73) Assignee: Victor Company of Japan, Limited, Kanagawa-ken (JP)

( * ) Notice: Subject to any disclaimer, the term of this patent is extended or adjusted under 35 U.S.C. 154(b) by 0 days.

(21) Appl. No.: 09/437,566

(22) Filed: Nov. 10, 1999

(30) Foreign Application Priority Data

Nov. 16, 1998 (JP) .................................. 10-325524
Jul. 22, 1999 (JP) .................................. 11-208163

(51) Int. Cl.$^7$ .................................................. G02B 26/08
(52) U.S. Cl. ........................................... 359/224; 359/214
(58) Field of Search .................... 359/223, 224, 359/201, 213, 214

(56) References Cited

U.S. PATENT DOCUMENTS

| 5,543,956 | * | 8/1996 | Nakagawa et al. | .................. | 359/225 |
| 5,959,760 | * | 9/1999 | Yamada et al. | ...................... | 359/224 |
| 6,007,208 | * | 12/1999 | Dickensheets et al. | ............. | 359/223 |

FOREIGN PATENT DOCUMENTS

| 6175060 | 6/1994 | (JP) . |
| 7072409 | 3/1995 | (JP) . |
| 8211320 | 8/1996 | (JP) . |
| 8334723 | 12/1996 | (JP) . |
| 10197819 | 7/1998 | (JP) . |

OTHER PUBLICATIONS

N. Asada et al., "Silicon Micromachined Two–Dimensional Galvano Optical Scanner", IEEE Transactions on Magnetics, vol. 30, No. 6, Nov. 1994, pp. 4647–4649.
M. Sekimura et al., "Electrostatic Torsion Mirror", Technical Digest of the 16$^{th}$ Sensor Symposium, 1998 pp. 167–170.

* cited by examiner

Primary Examiner—James Phan
Assistant Examiner—Euncha Cherry
(74) Attorney, Agent, or Firm—Nath & Associates PLLC; Gary M. Nath; Harold L. Novick

(57) ABSTRACT

A light deflection element has a pair of oscillating elements (6) and (7) having arms (6a) and (6b), and (7a) and (7b). respectively, the outer ends of which are fixed to a pair of supports (3) and (4) of a base (2), and the inner ends of which are free ends, a reflective mirror (8) disposed between arms (6a) and (6b), and arms (7a) and (7b) of the pair of oscillating elements (6) and (7), pairs of torsion springs (9a and 9b) and torsion springs (10a) and (10b), linking the inner ends of the arms (6a) and (6b) and the inner ends of the arms (7a) and (7b), respectively, at a pair of positions that are symmetrical about an axis (L) that passes through the center of gravity of the reflective mirror, and a drive apparatus (D) for applying a drive force separately and independently to the oscillating elements (6) and (7), so as to move the inner ends of the arms (6a), (6b), (7a), and (7b) upward and downward separately and independently.

8 Claims, 14 Drawing Sheets

LIGHT DEFLECTION ELEMENT AND DISPLAY APPARATUS USING SAME

BACKGROUND OF THE INVENTION

1. Field of the Invention

The present invention relates to a light deflection element that reflects and deflects light of a laser beam or the like, and to a display uses such a light deflection element.

2. Description of the Related Art

Light deflection elements are used in scanners of optical equipment such as electronic photocopiers, laser beam printers and barcode readers, in optical deflection apparatus such as optical disk (disc) tracking controllers, and in display apparatus in which a laser beam is scanned and an image is projected.

Typical elements used as light deflection elements include a rotating polygonal mirror and a galvano mirror, the galvano mirror featuring the ability to make a more compact mechanism than in the case of a rotating polygonal mirror, and using recent semiconductor microprocess technologies there have been reports of micromirrors using silicon substrates, leading to the expectation of even further improvements in compactness, light weight, and low cost.

An example of the above-noted galvano mirror type of light deflection element is disclosed in the Japanese patent application laid-open publication H8-211320. In this related art example, when a voltage is applied between one fixed electrode and a reflective mirror, the left side of the reflective mirror is attracted because of an electrostatic force, so that the reflective mirror rotates in the counterclockwise direction about a pair of beams as an axis, and when a voltage is applied between another fixed electrode and the reflective mirror, the right side of the reflective mirror is attracted by an electrostatic force, so that the reflective mirror rotates in the clockwise direction about the pair of beams as an axis. Therefore, by applying alternately applying a voltage to a pair of fixed electrodes using a driving apparatus, it is possible to cause the reflective mirror to swing to the left and right. Light that is shone onto this reflective mirror is reflected at an angle that changes in accordance with the swing of the reflective mirror, the light being thereby deflected.

In the example of the past, however, to achieve a large swing (deflection) angle with a reflective mirror, it is necessary to establish a large gap between the reflective mirror and the fixed electrodes. However, because the electrostatic force is inversely proportional to the square of this gap, to achieve the required drive force, an extremely large voltage is required, thereby making this approach substantially impractical.

Another example of related art is disclosed in the Japanese patent application laid-open publication H8-334723. In this related art example, a drive apparatus has a pair of left and right permanent magnets disposed on a base and a drive coil disposed around the periphery of a reflective mirror, a drive current alternating between positive and negative being passed through this drive coil. In this configuration, when a drive current alternating between positive and negative is passed through the drive coil, a Lorentzian force generated because of the outer magnetic field of the pair of permanent magnets and the current through the drive coil act to cause the reflective mirror to swing about a pair of beams as an axis.

In the above-noted related art example, however, while because there is no limitation to the deflection angle such as in the case of the previously described electrostatic drive, it is possible to achieve a large deflection angle, because of the drive coil disposed around the periphery of the reflective mirror, the size of the reflective mirror increases, making this approach unsuitable for high-speed deflection.

Additionally, in both the cited related art examples, because drive force is directly applied to the reflective mirror, it is necessary to configure the drive apparatus so that it does not interfere with the swinging of the reflective mirror, this representing a limitation to the degree of freedom in configuring the drive apparatus.

SUMMARY OF THE INVENTION

The present invention was made to solve the problems of the above-noted drawbacks. and has as an object to provide a light deflection element that provides a high degree of freedom in configuring a drive apparatus, this light deflection element being suitable for high-speed deflection at a high deflection angle, and to provide a display apparatus using the above-noted light deflection element.

From the first aspect of the present invention, there is provided a light deflection element that has a first oscillating element having two arms, the outer ends of which are fixed to one of a pair of supports provided at a distance from one another, and the inner ends of which are free ends, a second oscillating element having two arms, the outer ends of which are fixed to the other of the pair of supports, and an inner ends of which are free ends, a reflective mirror disposed between the two arms of each of the pair of oscillating elements, first torsion springs linking the inner ends of each of the arms of the first oscillating element to positions of the reflective mirror in proximity to and at a first position that is symmetrical about an axis that passes through the center of gravity of the reflective mirror, second torsion springs linking the inner ends of each of the arms of the second oscillating element to positions of the reflective mirror in proximity to and at a second position that is symmetrical about an axis that passes through the center of gravity of the reflective mirror, and a drive apparatus that applies a drive force to at least one of the pair of oscillating elements separately and independently, thereby causing the inner ends of the arms to move up and down separately and independently.

According to the above configuration, because drive force from each arm of the pair of oscillating elements acts in the region of the swinging (rotational) center of the reflective mirror, via the torsion springs, it is possible to achieve a large swing angle with a small drive stroke, thereby making it unnecessary to dispose a member of the drive apparatus at the reflective mirror, which enables the use of a small reflective mirror, thereby further enabling high-speed deflection to a large deflection angle. Additionally, because the drive apparatus is configured so as to act independently on the pair of oscillating elements, in contrast to the case in which the reflective mirror is directly driven, it is possible to achieve a high degree of freedom in configuring the drive apparatus, without the need to consider the swing of the mirror.

From the second aspect of the present invention, there is provided a light deflection element that has a first oscillating element having two arms, the outer ends of which are fixed to one of a pair of supports provided at a distance from one another, and the inner ends of which are free ends, a second oscillating element having two arms, an outer ends of which are fixed to the other of the pair of supports, and the inner ends of which are free ends, a reflective mirror disposed between the two arms of each of the pair of oscillating elements, first torsion springs linking the inner ends of each of the arms of the first oscillating, element to positions of the reflective mirror in proximity to and at a first position that is symmetrical about an axis that passes through the center of gravity of the reflective mirror, second torsion springs linking the inner ends of each of the arms of the second oscillating element to positions of the reflective mirror in proximity to and at a second position that is symmetrical about the axis that passes through the center of gravity of the reflective mirror, and a drive apparatus that applies a drive force to the four arms of the pair of oscillating elements separately and independently, thereby causing the inner ends of the arms to move up and down separately and independently.

According to the above-noted configuration, because the drive force from each arm of the pair of oscillating elements acts in the region of the swinging (rotational) center of the reflective mirror, via the torsion springs, it is possible to achieve a large swing angle with a small drive stroke, thereby making it unnecessary to dispose a member of the drive apparatus at the reflective mirror, thereby enabling the use of a small reflective mirror, and further enabling high-speed deflection to a large deflection angle. Additionally, because the drive apparatus is configured so as to act independently on the pair of oscillating elements, in contrast to the case in which the reflective mirror is directly driven, it is possible to achieve a high degree of freedom in configuring the drive apparatus, without the need to consider the swing of the mirror.

In the configurations described above, the drive apparatus may be configured so as to apply a drive force to the inner ends of each of the oscillating elements.

According to this configuration, because it is possible to apply the drive force of the drive apparatus directly to the reflective mirror via a pair of torsion springs, good response is achieved in transmitting the swing.

In the configurations described above, the drive apparatus may be disposed at each support, and is configured so as to apply drive force to the outer ends of each of the oscillating elements.

According to this configuration, because the drive apparatus serves also as a support for the pair of oscillating elements, the configuration is simplified.

From the third aspect of the present invention, there is provided a display apparatus that is provided with a light deflection element that has a first oscillating element having two arms, the outer ends of which are fixed to one of a pair of supports provided at a distance from one another, and the inner ends of which are free ends, a second oscillating element having two arms, the outer ends of which are fixed to the other of the pair of supports, and the inner ends of which are free ends, a reflective mirror disposed between the two arms of each of the pair of oscillating elements, first torsion springs linking the inner ends of each of the arms of the first oscillating element to positions of the reflective mirror in proximity to and at a first position that is symmetrical about an axis that passes through the center of gravity of the reflective mirror, second torsion springs linking the inner ends of each of the arms of the second oscillating element to positions of the reflective mirror in proximity to and at a second position that is symmetrical about an axis that passes through the center of gravity of the reflective mirror, and a drive apparatus that applies drive force to the pair of oscillating elements separately and independently, thereby causing the inner ends of the arms to move up and down separately and independently, wherein a laser beam is shone onto the reflective mirror of the light deflection element, the direction of the laser beam reflected thereby being caused to change by changing the rotational angle of the reflective mirror using the drive apparatus, so as to obtain a projected image.

According to the configuration described above, it is possible to achieve a display with a high scanning frequency.

In the configurations described above, the light reflected from the reflective mirror may be written by shining it onto an optical address spatial modulator, the light information written into the optical address spatial modulator being projected.

According to the configuration described above, it is possible to achieve a high resolution in a display that uses an optical address spatial modulator.

DETAILED DESCRIPTION OF THE PREFERRED EMBODIMENTS

Figure 1A:
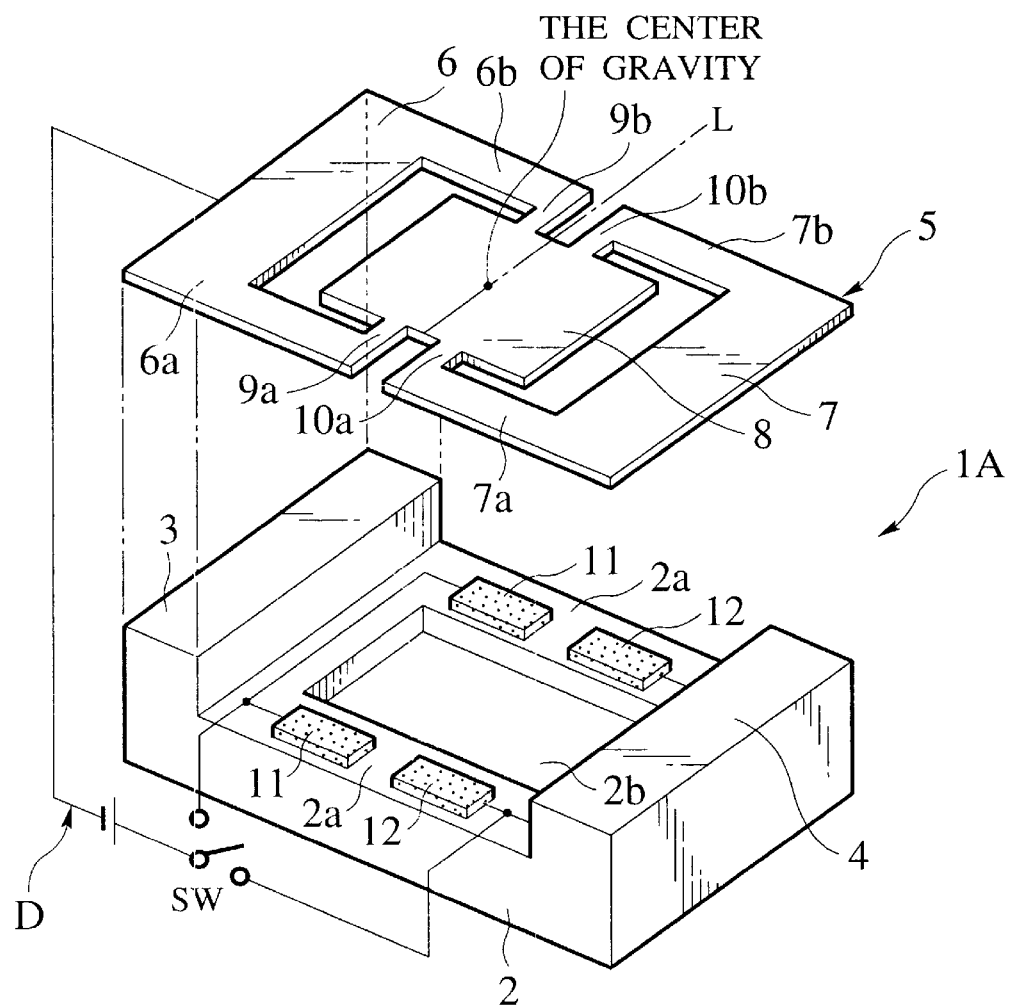
FIG. 1A is an exploded perspective view of an light deflection element according to the first embodiment of the present invention.

Preferred embodiments of the present invention will be described in detail below, with reference to the relevant accompanying drawings.

Referring to FIG. 1A through FIG. 3, a pair of supports 3 and 4 are formed as one to the left and right onto a base 2 of a light deflection element 1A, with a prescribed spacing therebetween, the front and rear edge parts 2a of the upper surface between this pair of supports 3 and 4 having between it a center depression 2b. An oscillating body 5 is disposed on the base 2 configured in this manner.

The oscillating body 5 has a first (left-side) oscillating element 6 having two arms 6a and 6b, the left outside ends thereof being fixed to the support 3 of the two supports, and the inside ends thereof being a free ends, a second (right-side) oscillating element 7 having two arms 7a and 7b, the right outside ends thereof being fixed to the support 4 of the two supports, and the inside ends thereof being a free ends, a reflective mirror 8 disposed in a space between the two arms 6a, 6b, 7a, and 7b of the pair of left and right oscillating elements 6 and 7, respectively, first (left-side) torsion springs 9a and 9b linking the reflective mirror 8 with the two arms 6a and 6b of the first oscillating element 6, and second (right-side) torsion springs 10a and 10b linking the reflective mirror 8 with the two arms 7a and 7b of the second oscillating element 7. In the oscillating body 5, therefore, the left-side oscillating element 6 and the right-side oscillating element 7 are in mutual opposition and form the outside frame part, the left-side and right-side oscillating elements 6 and 7 being connected together with the reflective mirror 8, via the left and right torsion springs 9a, 9b, 10a, and 10b. When the light deflection element 1A is operated in a resonance mode, of the resonance modes of the vibrating system formed by the torsion springs 9a, 9b, 10a, and 10b and the reflective mirror 8, the mode used is that mode (the primary rotational mode) in which rotation occurs about the axis L.

Figure 2:
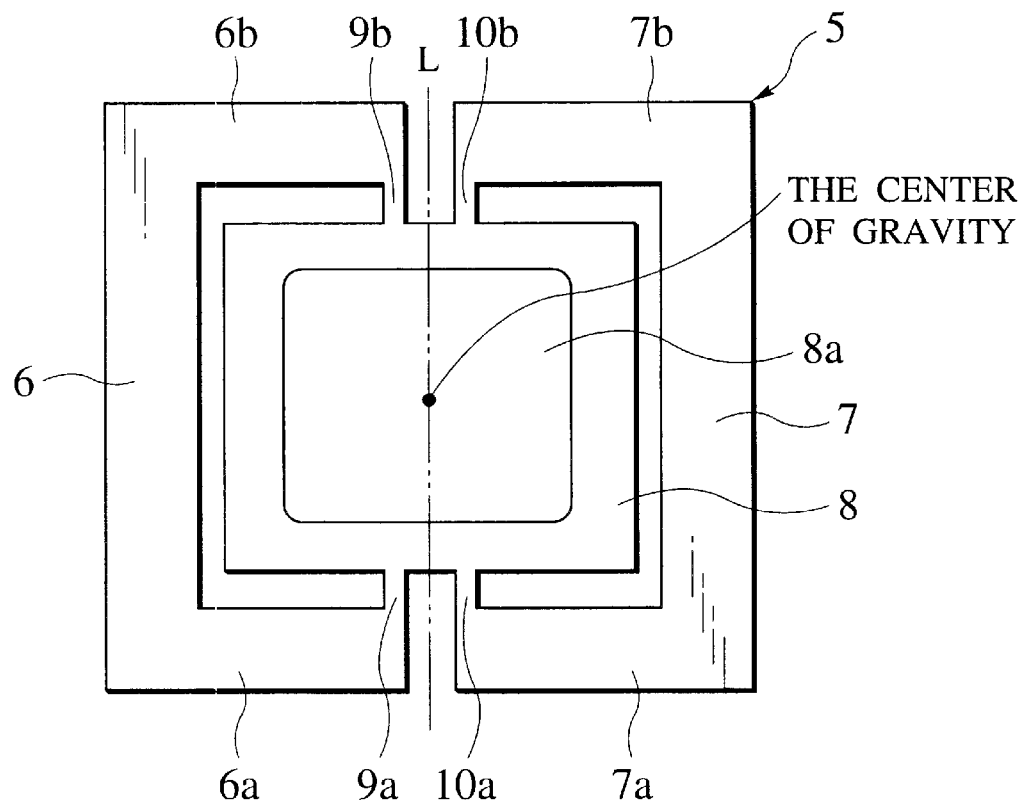
FIG. 2 is a plan view of oscillating elements according to the first embodiment of the present invention.

As shown in FIG. 2, the surface of the reflective mirror 8 has a light-reflective film 8a, the lowest-order resonant frequency of the reflective mirror 8 being set so that it is higher than the above-noted primary rotational mode. The resonant frequency of the reflective mirror 8 is preferably set so that it substantially corresponds to the desired vibration frequency of the reflective mirror 8.

The pairs of torsion springs 9a, 9b, 10a, and 10b are formed as beams by making a cutout at the front and rear on the axis L that passes through the center of gravity of the reflective mirror 8, and the pairs of torsion spring 9a, 9b, 10a, and 10b are linked to the free ends of the arms 6a, 6b, 7a, and 7b, at pairs of locations that are symmetrical about the axis L and in proximity thereto.

The fabrication of the above-noted oscillating body 5 is done, for example, by patterning and then etching a silicon wafer. The surface that is to serve as the reflective mirror 8 has formed onto it a light-reflective film 8a of a material such as aluminum or gold, thereby completing the fabrication of the reflective mirror 8. By adopting this fabrication method, it is possible to fabricate a plurality of reflective mirrors 8 simultaneously.

A drive apparatus D has a pair of fixed electrodes 11 and 12 at the left and right, these being disposed at positions that are opposite the free ends of the each of the arms 6a, 6b, 7a, and 7b of the two oscillating elements 6 and 7. The opposing electrodes to the fixed electrodes are formed by the free ends of the arms 6a, 6b, 7a, and 7b, the configuration being such that a selection switch SW can selectively apply a voltage between the arms 6a, 6b, 7a, and 7b and the fixed electrodes 11 and 12. Thus, the drive apparatus D can separately and independently drive the pairs of oscillating elements 6 and 7, depending upon the switching position of the selection switch SW. The drive apparatus D performs control so as to sequentially switch the selection switch SW, so as to alternately apply a voltage to pairs of fixed electrodes 11 and 12. Because the oscillating elements 6 and 7 are connected to each other the application of a voltage to the arms 6a, 6b, 7a, and 7b of the oscillating elements 6 and 7, as described above, can be done by applying a voltage with either one of the oscillating elements as a common.

Figure 1B:
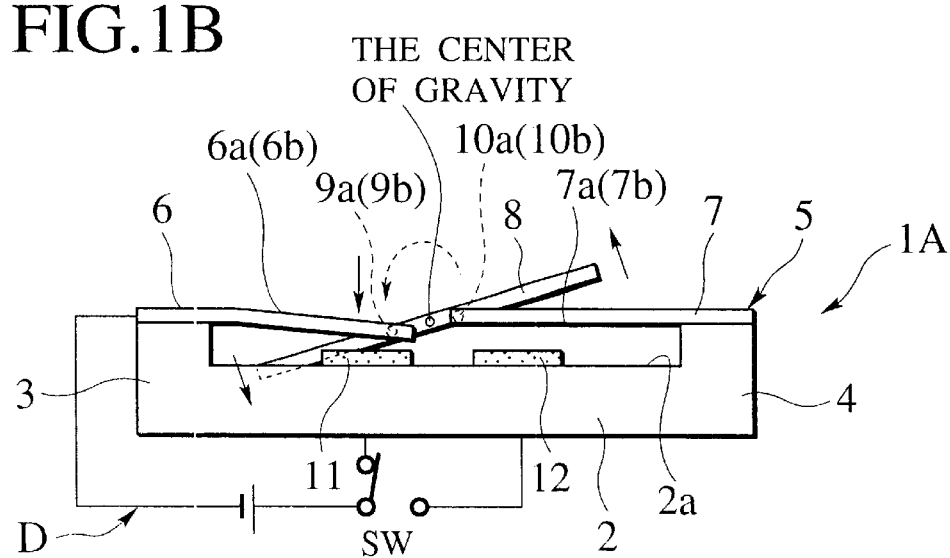
FIG. 1B is a side view thereof.

In the above-noted configuration, as shown in FIG. 1B, when a voltage is applied to the first (left-side) fixed electrode 11, the free ends of the first (left-side) oscillating element arms 6a and 6b are attracted downward by an electrostatic force. When this occurs, the downward movement of the arms 6a and 6b is transmitted to the reflective mirror 8 via the first (left-side) torsion springs 9a and 9b, this acting as a rotational torque that results in the reflective mirror 8 rotating in the counterclockwise direction about the axis L that passes substantially through the center of gravity.

Figure 3:
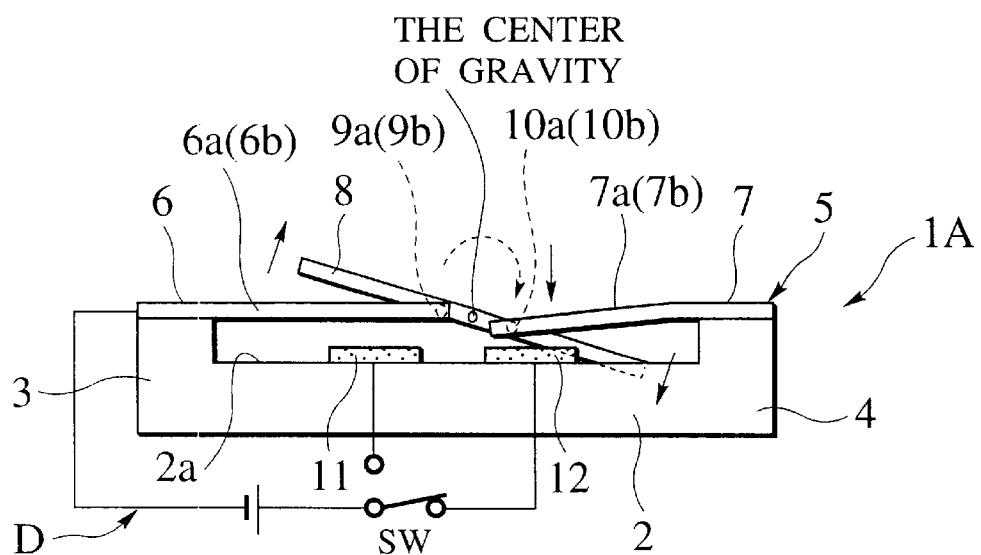
FIG. 3 is a side view of a light deflection element according to the first embodiment of the present invention.

As shown in FIG. 3, when a voltage is applied to the second (right-side) fixed electrode 12, the attractive force acting on the first (left-side) arms 6a and 6b is released, these arms 6a and 6b returning upward, while the free ends of the arms 7a and 7b of the second (right-side) oscillating element 7 are attracted downward by an electrostatic force. When this occurs, the downward movement of the arms 7a and 7b is transmitted to the reflective mirror 8 via the second (right-side) torsion springs 10a and 10b, this acting as a rotational torque that results in the reflective mirror 8 rotating in the clockwise direction about the axis L that substantially passe through the center of gravity.

If a voltage is applied alternately to the pair of fixed electrodes 11 and 12 by the drive apparatus D, the rotation of the reflective mirror 8 is repeated, thereby resulting in the vibration of the reflective mirror 8.

As a result of the above-noted operation, a drive force from the arms 6a, 6b, 7a, and 7b, via the torsion springs 9a, 9b, 10a, and 10b, acts at a point near the center of vibration (rotation) of the reflective mirror 8, so that it is possible to achieve a large swing angle with a small drive stroke. Additionally, because there is no need to dispose any member of the drive apparatus D at the reflective mirror 8, it is possible to achieve high-speed swing with a small reflective mirror 8.

In particular, if the reflective mirror 8 is caused to vibrate in resonance in the first order rotational mode, the reflective mirror 8 vibrates with the maximum deflection amplitude, it is possible to make the up and down amplitude of the arms 6a, 6b, 7a, and 7b extremely small, thereby enabling a large rotating force with a small amount of electrical power.

The drive apparatus D is configured so as to apply a drive force separately and independently to the pair of oscillating elements 6 and 7, and as long as the reflective mirror 8 is caused to vibrate in a resonant condition, it is possible to configure this drive apparatus D to apply a drive force only one of the oscillating elements 6 and 7, thereby causing that oscillating element to vibrate in resonance. Additionally, it is possible to configure the drive apparatus so as to apply a drive force to only one of the arms 6a, 6b, 7a, and 7b of one of the oscillating elements 6 and 7. This option applies as well to the embodiments to be described below. That is, it is sufficient to have a configuration whereby when the reflective mirror 8 is caused to vibrate in resonance, drive force is applied to at least one of the four arms 6a, 6b, 7a, and 7b of one of the oscillating elements 6 and 7.

Figure 4:
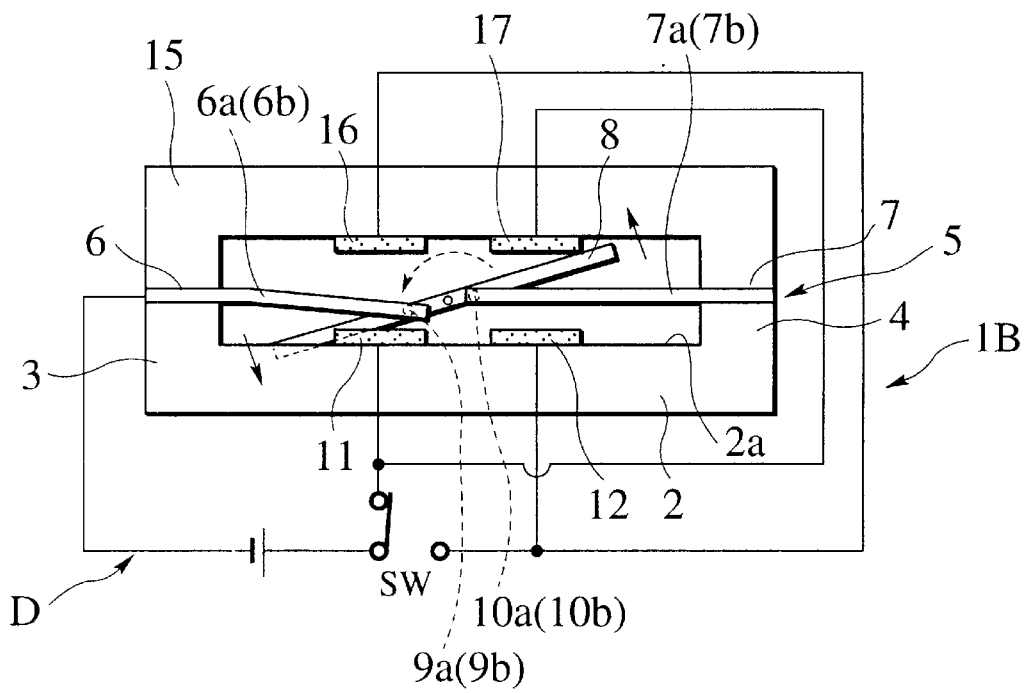
FIG. 4 is a side view of a light deflection element according to the second embodiment of the present invention.
Figure 5:
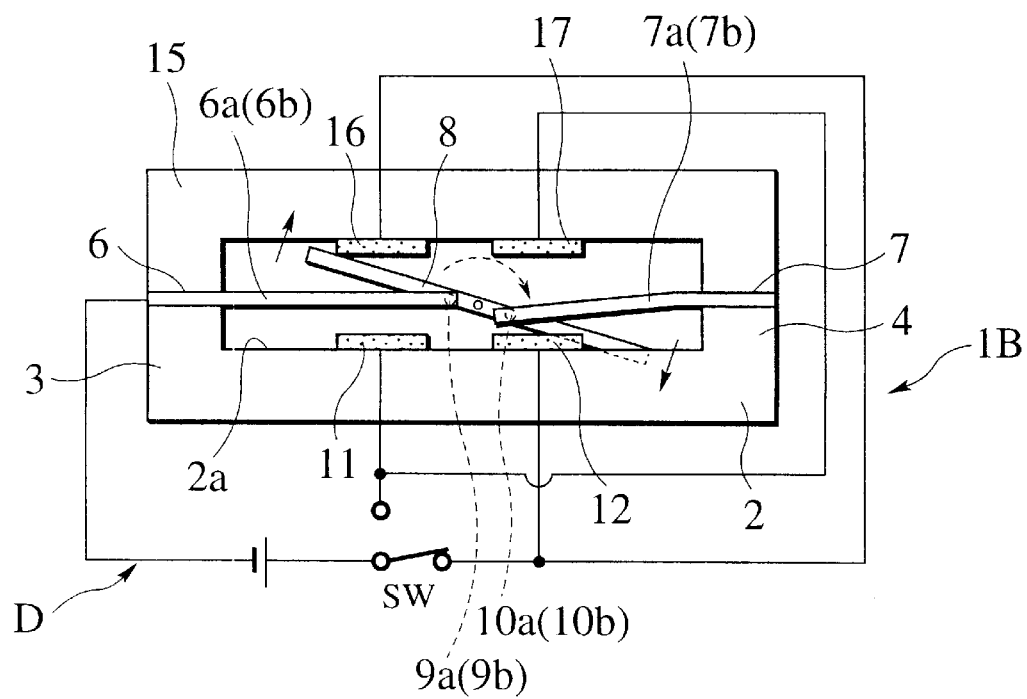
FIG. 5 is a side view of a light deflection element according to the second embodiment of the present invention.

FIG. 4 and FIG. 5 are side views of a light deflection element 1B that show the second embodiment of the present invention. In the second embodiment as shown in FIG. 4 and FIG. 5, elements that are in common with the first embodiment are assigned the same reference numerals, and will not be explicitly described herein, the description that follows being limited to the differences in the second embodiment with respect to the first embodiment.

Specifically, the oscillating body 5 is disposed on a base 2, and an upper base 15 is further disposed over the oscillating body 5. A pair of fixed electrodes 16 and 17 are disposed on this upper base 15, this pair of fixed electrodes 16 and 17 being disposed in the same pattern as those on the base 2. The configuration is such that a voltage is applied to one of (the left-side) fixed electrodes 16 with the same timing as the other-side (right-side) fixed electrode 12 on the base 2, and such that a voltage is applied to the other (right-side) fixed electrode 17 with the same timing as the other-side (left-side) fixed electrode 11 on the base 2.

According to the configuration of the second embodiment, as shown in FIG. 4, when a voltage is applied to the one fixed electrode 11 (on the lower left side as shown in FIG. 4), a voltage is applied to another fixed electrode 17 on the upper right side in FIG. 4. Therefore, an electrostatic force acts to attract and move the free ends of the arms 6a and 6b of the left-side oscillating element 6 downward, and an electrostatic force acts to attract and move the free ends of the arms 7a and 7b of the oscillating element 7 upward. When this occurs, the downward movement of the arms 6a and 6b is transmitted via the torsion springs 9a and 9b on the left side to the reflective mirror 8, and the upward movement of the arms 7a and 7b is transmitted via the torsion springs 10a and 10b to the reflective mirror 8, these acting as a rotational torque in the same direction, which causes the reflective mirror 8 to rotate in the counterclockwise direction about an axis that substantially passes through the center of gravity thereof.

As shown in FIG. 5, when a voltage is applied to the fixed electrode 12 (on the lower right side as shown in FIG. 5), a voltage is applied to another fixed electrode 16 on the upper-left in FIG. 5. Therefore, an electrostatic force acts to attract and move the free ends of the arms 7a and 7b of the right-side oscillating element 7 downward, and an electrostatic force acts to attract and move the free ends of the arms 6a and 6b of the oscillating element 6 upward. When this occurs, the downward movement of the arms 7a and 7b is transmitted via the torsion springs 10a and 10b on the right side to the reflective mirror 8, and the upward movement of the arms 6a and 6b is transmitted via the torsion springs 9a and 9b on the left side to the reflective mirror 8, these movements acting as a rotational torque in the same direction. which causes the reflective mirror 8 to rotate in the clockwise direction about an axis that substantially passes through the center of gravity thereof. Essentially, compared with the first embodiment, in the case of the second embodiment because approximately twice the rotational torque acts, the second embodiment is further suited to large deflection angles.

Figure 6:
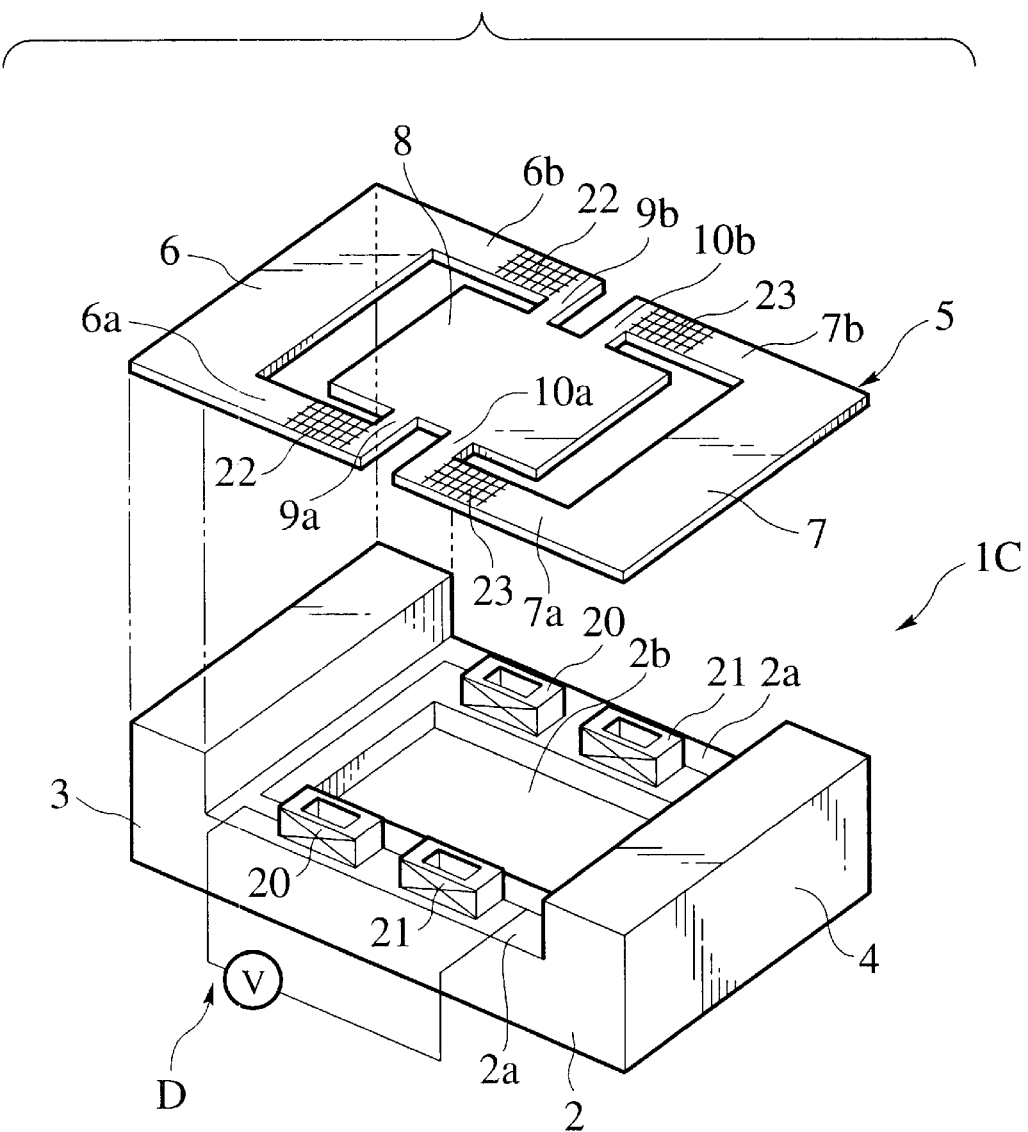
FIG. 6 is an exploded perspective view of a light deflection element according to the third embodiment of the present invention.

FIG. 6 is an exploded perspective view of a light deflection element 1C that shows the third embodiment of the present invention. In FIG. 6, because the only difference with respect to the first embodiment is the configuration of the drive apparatus D, other parts of the configuration being the same as the first embodiment, only the drive apparatus D will be described herein, other elements being assigned the same reference numerals as in the first embodiment and not been explicitly described herein.

Specifically, in the case of the third embodiment, the drive apparatus D has pairs of drive coils 20 and 21 disposed to the left and right on both the front and rear ends 2a of the base 2, and permanent magnets 22 and 23, two each of which as disposed on the free ends 6a, 6b, 7a, and 7b of the pair of oscillating elements 6 and 7 at locations that are opposite each of the drive coils 20 and 21. These permanent magnets 22 and 23 are all magnetized in the same thickness direction thereof. The configuration is such that a drive current is periodically caused to flow through the drive coils 20 and 21 with mutually opposite phases. That is, the direction of the magnetic field generated by the current flowing in the drive coil 20 is the opposite of the direction of the magnetic field generated by the current flowing in the drive coil 21.

When the arms 6a and 6b of the left side are attracted downward by the electromagnetic force of the magnetic field generated by one of the drive coils 20, the arms 7a and 7b on the right side are repulsed upward by the electromagnetic force of the magnetic field generated by the other drive coil 21. When the arms on the right side 7a and 7b are attracted downward by the electromagnetic force of the magnetic field generated by the drive coil 21, the arms 6a and 6b on the left side are repulsed upward by the electromagnetic force of the magnetic field generated by the drive coil 20. Because of this action, because the same type of rotational torque acts on the reflective mirror 8 as in the second embodiment, by alternately applying the above-noted currents repeatedly, the reflective mirror vibrates.

Figure 7:
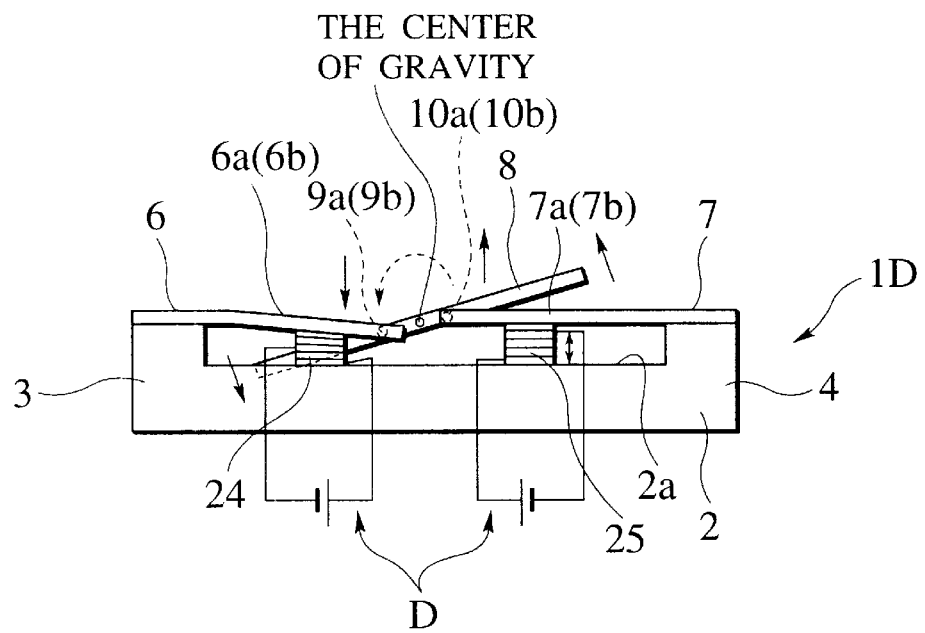
FIG. 7 is a side view of a light deflection element according to the fourth embodiment of the present invention.

FIG. 7 shows the fourth embodiment of the present invention, which differs with respect to the first embodiment with regard to the configuration of the drive apparatus D, other elements being the same and being assigned the same reference numerals as in the first embodiment, a description being provided below of only those parts of the configuration that differ from the first embodiment.

Specifically, the drive apparatus D in the fourth embodiment has laminated piezo-electric actuators 24 and 25 disposed between the front and rear ends 2a of the base 2 and the free ends of the arms 6a, 6b, 7a, and 7b of the pair of oscillating elements 6 and 7, the upper and lower surfaces of each of the laminated piezo-electric actuators 24 and 25 being fixed to the base 2 and the arms 6a, 6b, 7a, and 7b. The pairs of laminated piezo-electric actuators 24 and 25 have alternately applied to them a mutually opposite phase voltage.

Because the laminated piezo-electric actuators 24 and 25 exhibit a change in volume in the lamination direction in response to an applied voltage, the same type of rotational torque acts, via the pairs of torsion spring 9a, 9b, 10a, and 10b, on the reflective mirror 8 as does in the first embodiment.

Figure 8:
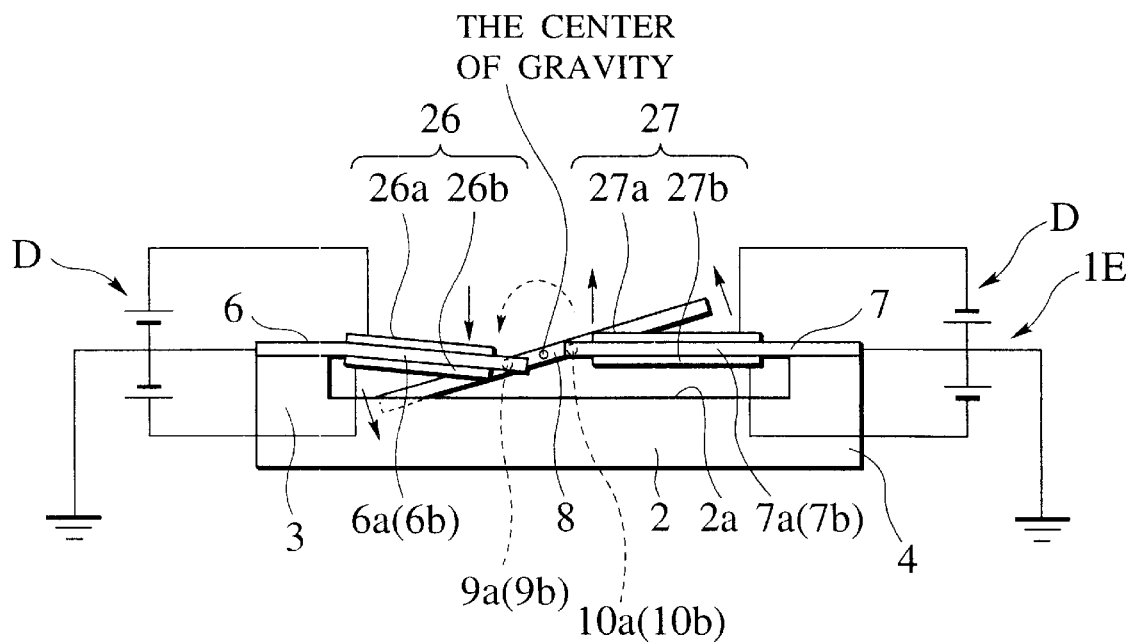
FIG. 8 is a side view of a light deflection element according to the fifth embodiment of the present invention.

FIG. 8 is a side view of a light deflection element 1E which shows the fifth embodiment of the present invention. In FIG. 8, because the only difference with respect to the first embodiment is with regard to the configuration of the drive apparatus D, all other parts of the configuration being the same, only the drive apparatus D configuration will be described, with elements corresponding to those of the first embodiment being assigned the same reference numerals, and not being described explicitly herein.

Specifically, the drive apparatus D has piezo-electric elements 26a, 26b, 27a, and 27b, which are made of PZT (plumbum (lead) zirconate titanate) or the like, disposed at the upper and lower surfaces of the two arms each 6a, 6b, 7a, and 7b of the pair of oscillating elements 6 and 7. The piezo-electric elements 26a and 26b and the piezo-electric elements 27a and 27b form the piezo-bimorphs 26 and 27, respectively, to which a voltage of mutually opposite phase is periodically applied.

When a voltage is applied between the pairs of piezo-electric elements 26a, 26b, 27a, and 27b of the piezo-bimorphs 26 and 27, because the piezo-electric material is polarized, causing the arms 6a, 6b, 7a, and 7b to flex, it is possible to have the same type of rotational torque as in the first embodiment act, via the torsion spring pairs 9a and 9b, and 10a and 10b, on the reflective mirror 8.

It is sufficient that a piezo-electric element be disposed on minimally only one of the upper and lower surfaces of the arms 6a, 6b, 7a, and 7b, in which case the action is that of a piezo-unimorph which, although compared with a piezo-bimorph has a reduced generated force, can be used to achieve the same type of actuation.

Figure 9:
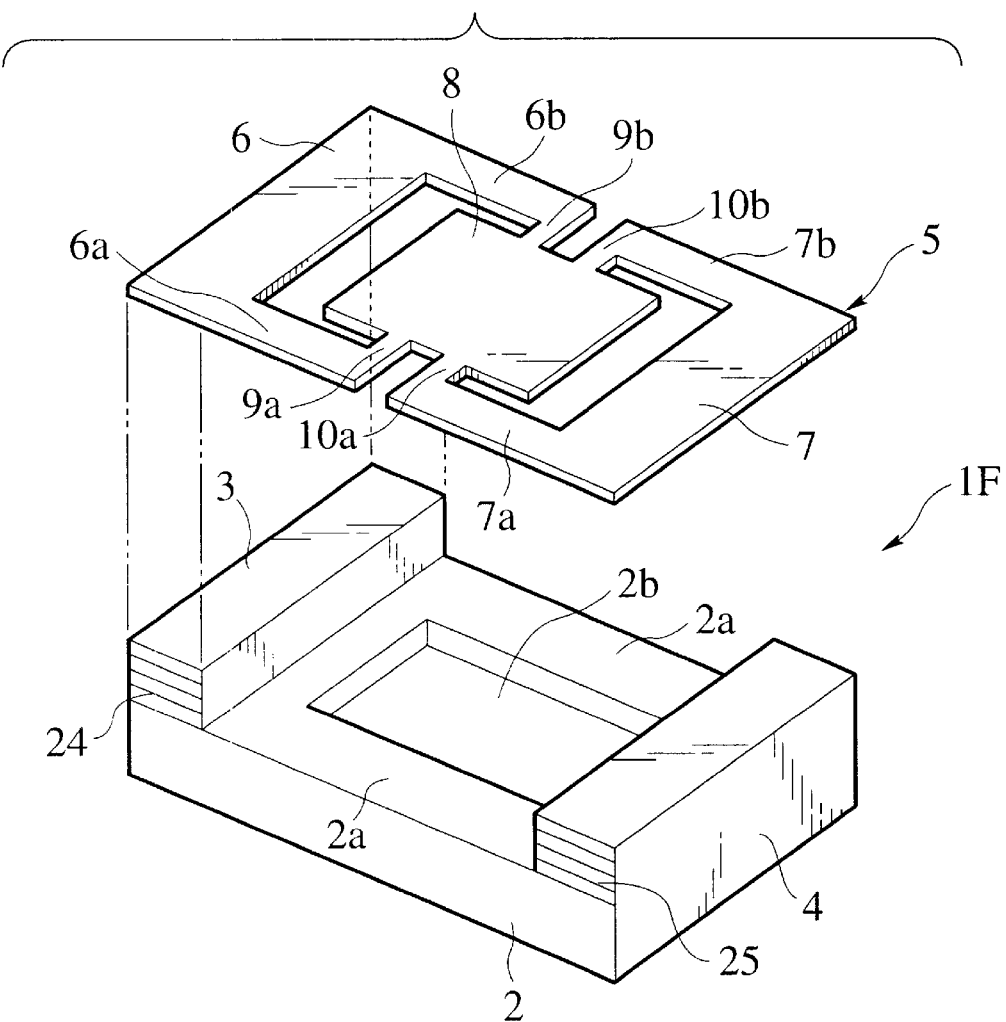
FIG. 9 is an exploded perspective view of a light deflection element according to the sixth embodiment of the present invention.
Figure 10:
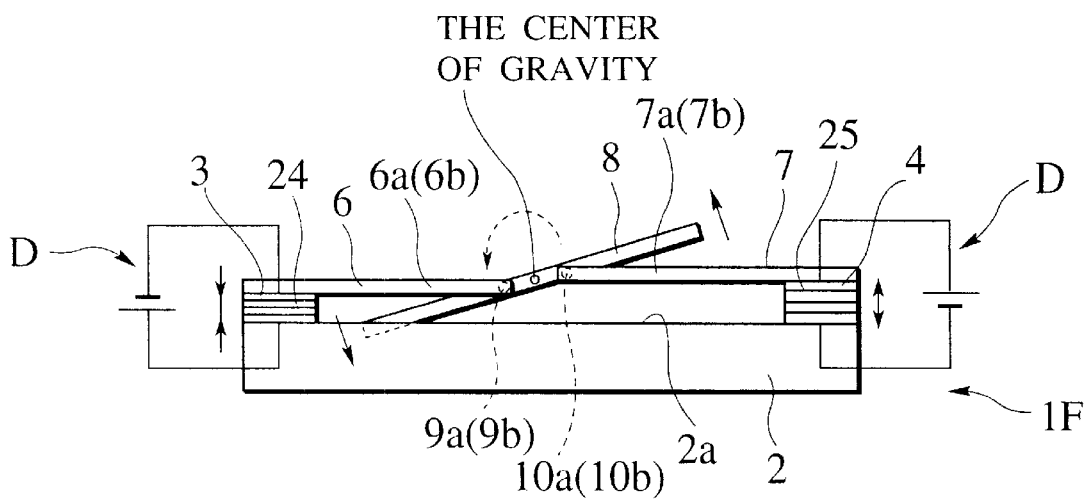
FIG. 10 is a side view of a light deflection element according to the sixth embodiment of the present invention.

FIG. 9 and FIG. 10 show the sixth embodiment of the present invention, FIG. 9 being an exploded perspective view of a light deflection element 1F, and FIG. 10 being a side view of the light deflection element 1F. In FIG. 9 and FIG. 10, elements that are the same as in the first embodiment are assigned the same reference numerals, and are not explicitly described herein, only those parts of the configuration that are different being described below.

Specifically, the pair of supports 3 and 4 are each formed by a laminated piezo-electric actuator 24 and 25, respectively, the outer ends of a pair of oscillating elements 6 and 7 being fixed to the upper surfaces of the laminated piezo-electric actuators 24, and 25, respectively. The configuration is such that a voltages of mutually opposite phase are periodically applied to the pair of laminated piezo-electric actuators 24 and 25. That is, the laminated piezo-electric actuators not only form the support for the pair of oscillating elements 6 and 7, but also serve as part of the drive apparatus D.

Because the voltage applied to the laminated piezo-electric actuators causes the volume thereof to change in the lamination direction, as shown in FIG. 10, because when the laminated piezo-electric actuator 24 moves downward the entire left-side oscillating element 6 is displaced downward, the result being that a counterclockwise rotational torque acts, via the left-side coil springs 9a and 9b, on the reflective mirror 8. Because when the right-side laminated piezo-electric actuator 25 moves downward, the entire right-side oscillating element 7 is displaced downward, the result being that a clockwise rotational torque acts, via the right-side coil spring 10a and 10b, on the reflective mirror 8. When voltages of mutually opposite phases are applied periodically by the drive apparatus D to the pair of laminated piezo-electric actuators 24 and 25, the forward and reverse rotation of the reflective mirror 8 is repeated, causing the reflective mirror 8 to vibrate.

In this sixth embodiment, the configuration is such that the drive force of the drive apparatus D acts on the outer ends of the pair of oscillating elements 6 and 7, which is in contrast to the first through the fifth embodiments, in which the drive force of the drive apparatus D acts on the inner ends (free ends) of the arms 6a, 6b, 7a, and 7b of the oscillating elements 6 and 7. Because in the first through the fifth embodiments the drive force of the drive apparatus D acts on the inner ends (free ends) of the arms 6a, 6b, 7a, and 7b, it is possible to have this act directly on the reflective mirror, via a pair of torsion springs, thereby achieving good vibration transmission response. In the sixth embodiment, because the pair of laminated piezo-electric actuators 24 and 25 serve also as the support for the pair of oscillating elements 6 and 7, the configuration is simplified.

Figure 11:
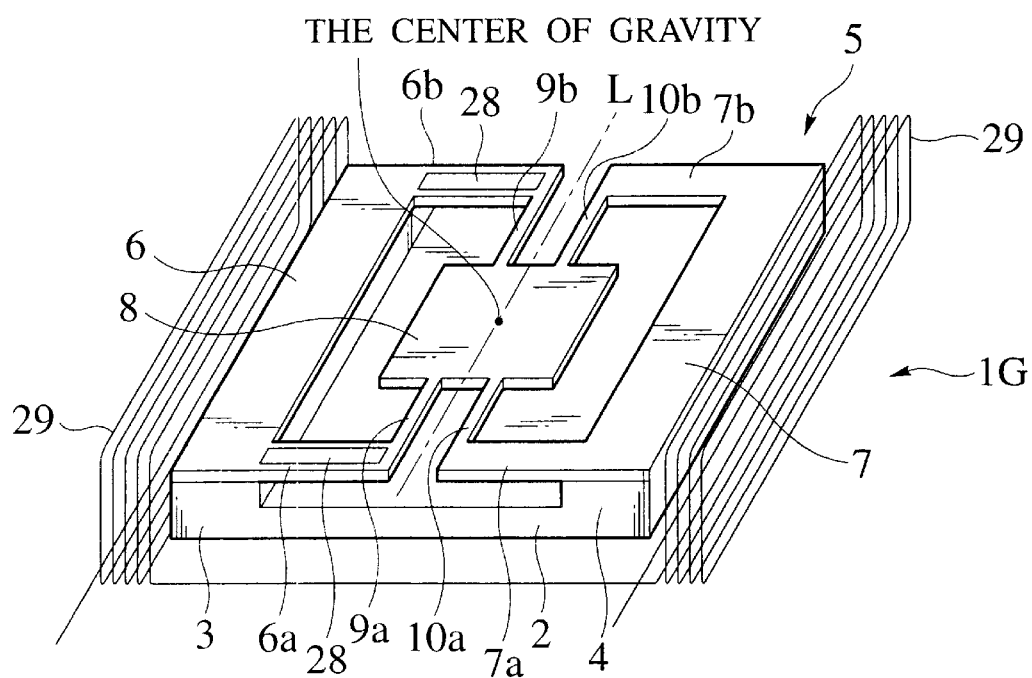
FIG. 11 is a perspective view of a light deflection element according to the seventh embodiment of the present invention.

FIG. 11 is a simplified perspective view of a light deflection element 1G, showing the seventh embodiment of the present invention. In FIG. 11, because the only difference with respect to the first embodiment is that of the configuration of the drive apparatus D, other elements being the same, only the drive apparatus D configuration is described below, other elements being assigned the same reference numerals as in the first embodiment, and not being described explicitly herein.

Specifically, the drive apparatus D of the seventh embodiment has a magnetostrictive element 28 that is provided on the surface of the free ends of the two arms 6a and 6b of one of the oscillating elements 6, and a pair of magnetic field generating coils 29, for generating a magnetic field at the magnetostrictive element 28. The magnetostrictive element 28 is made of a material having a large magnetostriction ratio, and when a current is passed through the magnetic field generating coil 29, the magnetostrictive element 28 is magnetized. The configuration is such that currents of opposite phase are alternately passed through the pair of magnetic field generating coils 29.

That is, when currents pass through the pair of magnetic field generating coils 29, in the case for example in which the magnetostrictive element 28 has a positive magnetostriction ratio, it will elongate as a result of the magnetic field, the result being a flexing downward of the arms 6a and 6b, thereby causing a rotational torque of the type seen in the first embodiment to act, via the pair of torsion springs 9a and 9b, on the reflective mirror 8.

If the magnetostrictive element 28 measures 100 μm by 2000 μm and has a thickness of 2 μm, the antimagnetic field within the surface is of a level that can be ignored, and if the permeability of the magnetostrictive element 28 is 1000, it is possible to cause sufficient saturation with a magnetic field of approximately 20 Oe. For arms 6a and 6b made of polysilicon, a magnetostrictive element made of nickel, the length of the arms 6a and 6b and the magnetostrictive element 28 being 2 mm, the thickness of the arms 6a and 6b being 50 μm, and the thickness of the magnetostrictive element 28 being 2 μm, the estimated deflection amount δ at the inner ends (free ends) of the arms 6a and 6b is approximately 0.3 μm, so that if the arms 6a and 6b are driven at the frequency of the first order rotational mode, it is easily possible to achieve a deflection of ±5 degrees.

Because the drive apparatus D that uses the magnetostrictive element 28 does not require drive leads from the base 2 or from the oscillating body 5, an advantage is provided in terms of avoiding a drop in yield and an increase in cost.

It is also possible to provide the magnetostrictive element 28 not at the two arms 6a and 6b of the oscillating element 6, but rather at the free ends of the two arms 7a and 7b of the other oscillating element 7. As described with regard to the first embodiment, in causing the reflective mirror 8 to vibrate in resonance it is sufficient to provide a magnetostrictive element 28 at any one of the four arms 6a, 6b, 7a, and 7b of the oscillating elements 6 and 7. and to apply a drive force to one of the arms 6a, 6b, 7a, and 7b.

Figure 12:
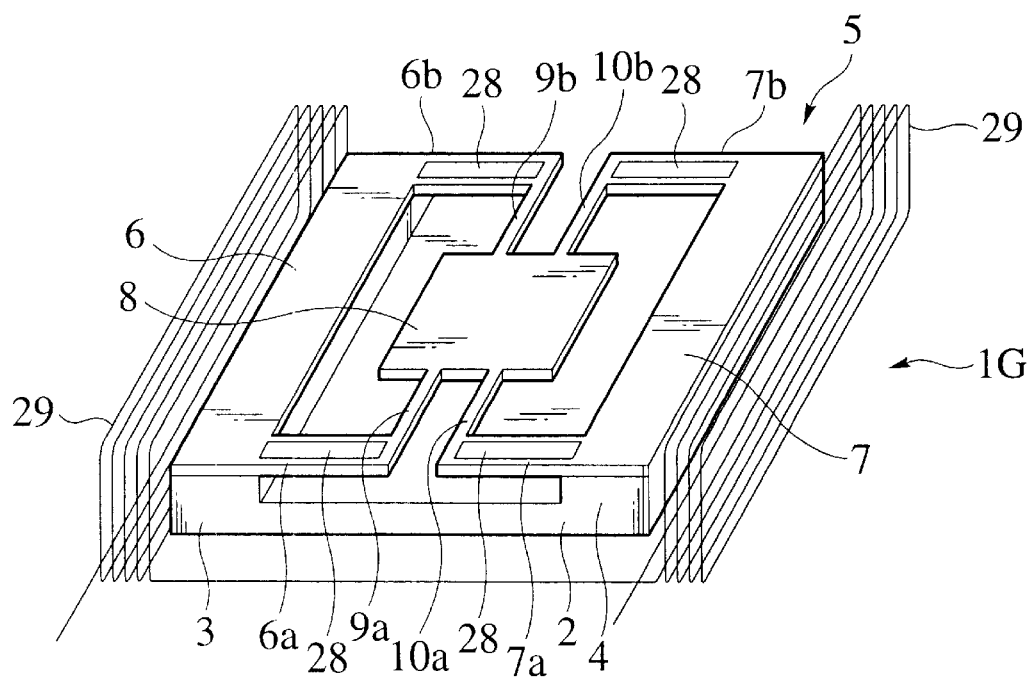
FIG. 12 is a perspective view of a light deflection element according to a variation of the seventh embodiment of the present invention.

FIG. 12 is a simplified perspective view of a light deflection element 1G. showing a variation of the seventh embodiment of the present invention. in which a magnetostrictive element 28 is provided on all the arms 6a, 6b, 7a, and 7b of the pair of oscillating elements 6 and 7. The magnetostrictive elements 28 of the arms 6a and 6b of the oscillating element 6 and the magnetostrictive elements 28 of the arms 7a and 7b of the oscillating element 7 are configured so that the polarity of their magnetostriction ratios are opposite. However, it is possible to have all the magnetostriction polarities be the same, if the surfaces on which the magnetostrictive elements 28 are formed are reversed on the front and rear of the arms 6a and 6b and the arms 7a and 7b.

That is, when a current is passed through the magnetic field generating coils 29, one of the left and right magnetostrictive elements 28 elongates and the other contracts, the result being that left and right arms 6a, 6b, 7a, and 7b flex upward and downward in opposite phases, so that a rotation torque such as in the first embodiment is applied, via the torsion springs 9a, 9b, 10a, and 10b, to the reflective mirror 8.

In the seventh embodiment and the above-noted variation thereof, the magnetostrictive elements 28 are provided on the front surfaces of the arms 6a, 6b, 7a, and 7b, although it can also be provided on the rear surfaces thereof, and can additionally be provided on both the front and rear surfaces thereof, in which case, however, the polarities of the magnetostriction ratio are reversed on the front and rear surface magnetostrictive elements 28.

Figure 13:
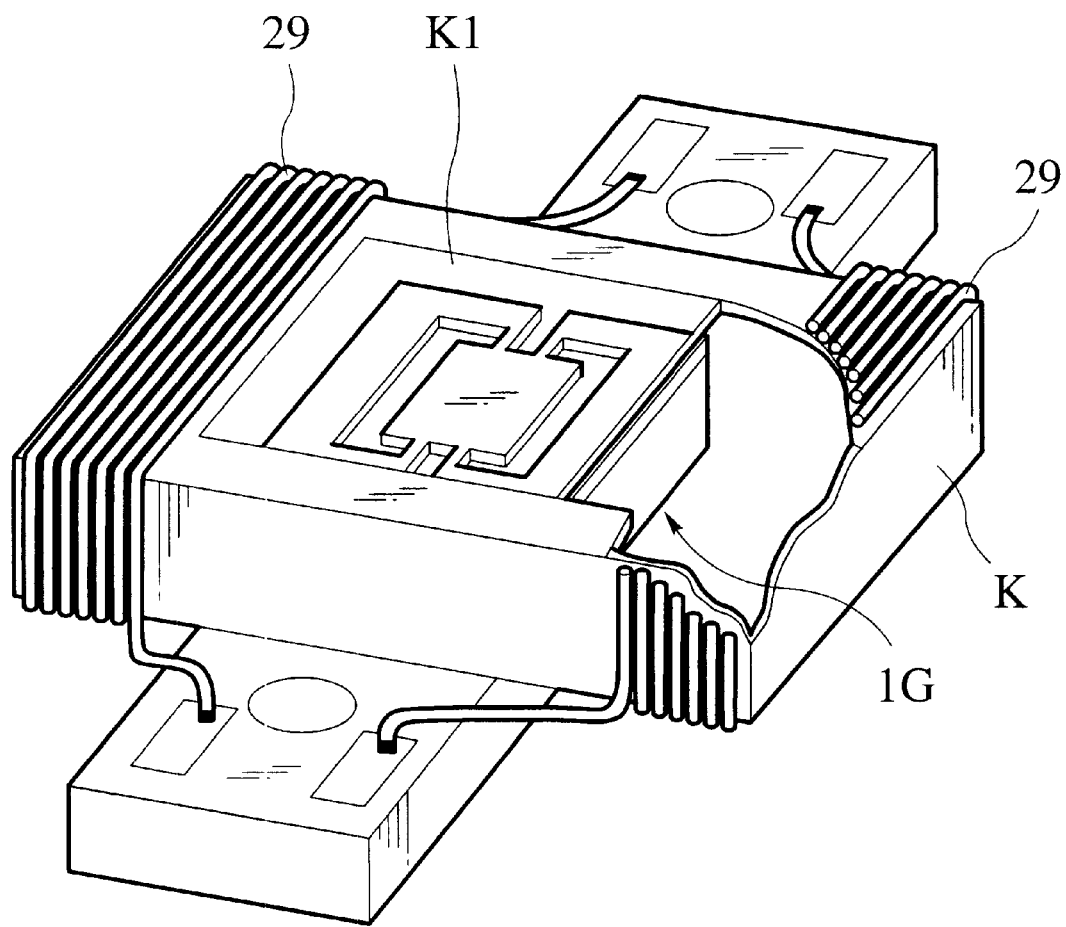
FIG. 13 is a perspective view of an application of the seventh embodiment of the present invention showing the condition of the light deflection element built into an enclosure.

FIG. 13 shows an example of an application of the seventh embodiment of the present invention, this being a simplified perspective view showing the condition of the light deflection element 1G built into an enclosure K. As shown in FIG. 13, minimally a surface K1, opposing the reflective mirror 8, of the enclosure K is made of a material that passes a light beam that is deflected. While the enclosure (housing) K can be merely an enclosure for protecting the reflective mirror 8, by making it of sealed construction and either vacuating the inside thereof or filling the inner space with an inert gas, it is possible to improve immunity to environmental conditions. If this type of configuration is adopted, by disposing the magnetic field generating coils 29 on around the outside of the enclosure K, because there is no need to run leads from the light deflection element 1G, the vacuum or gas integrity of the enclosure is improved.

Figure 14:
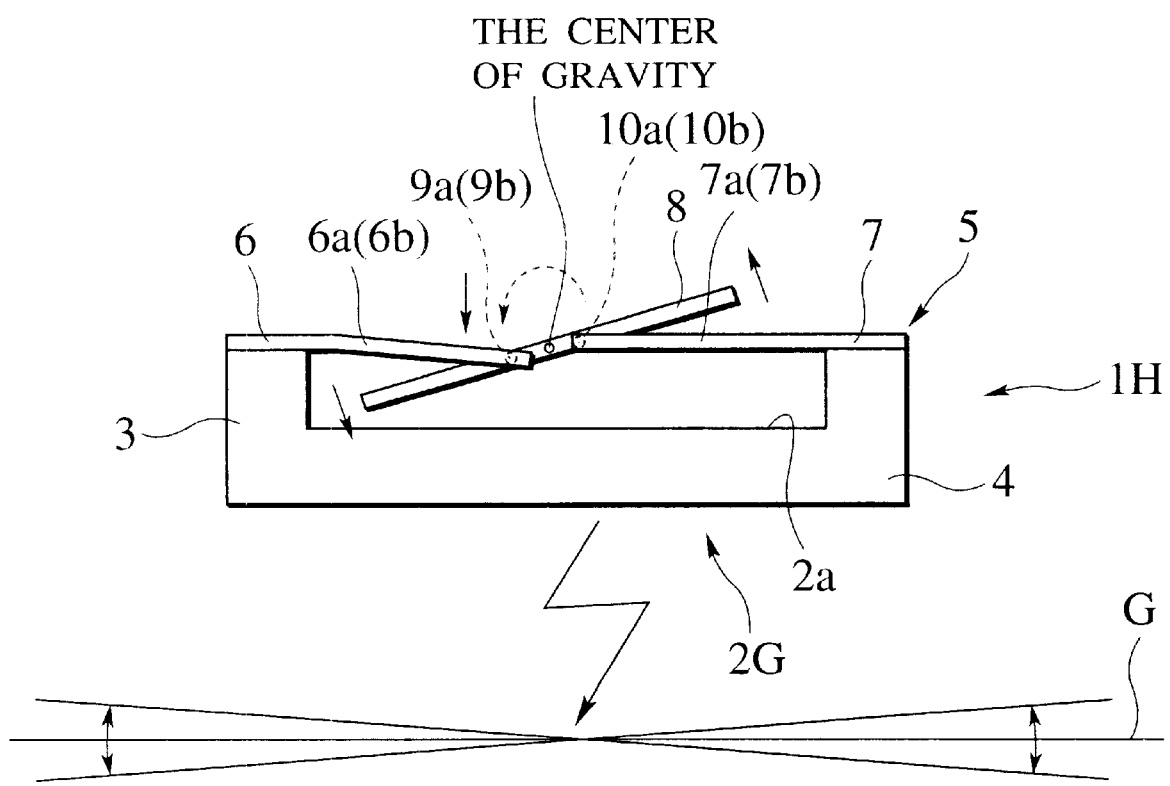
FIG. 14 is a side view of a light deflection element according to the eighth embodiment of the present invention.

FIG. 14 is a side view of a light deflection element 1H, showing the eighth embodiment of the present invention. In the eighth embodiment, the oscillating body 5 is placed on the pair of supports 3 and 4 and caused to vibrate. That is, an oscillating body 5 that has a reflective mirror 8 but not a drive system is caused to vibrate on an external rotational vibrating surface G of a vibrating support G, so that the reflective mirror 8 is caused to resonate, thereby achieving a sufficient deflection from the vibrating surface. Other parts of the configuration of the eighth embodiment are the same as in the first embodiment, are assigned the same reference numerals, and will not be explicitly described herein. It should be noted that there is no restriction with regard to the drive apparatus of the external rotational vibration surface G.

Figure 15:
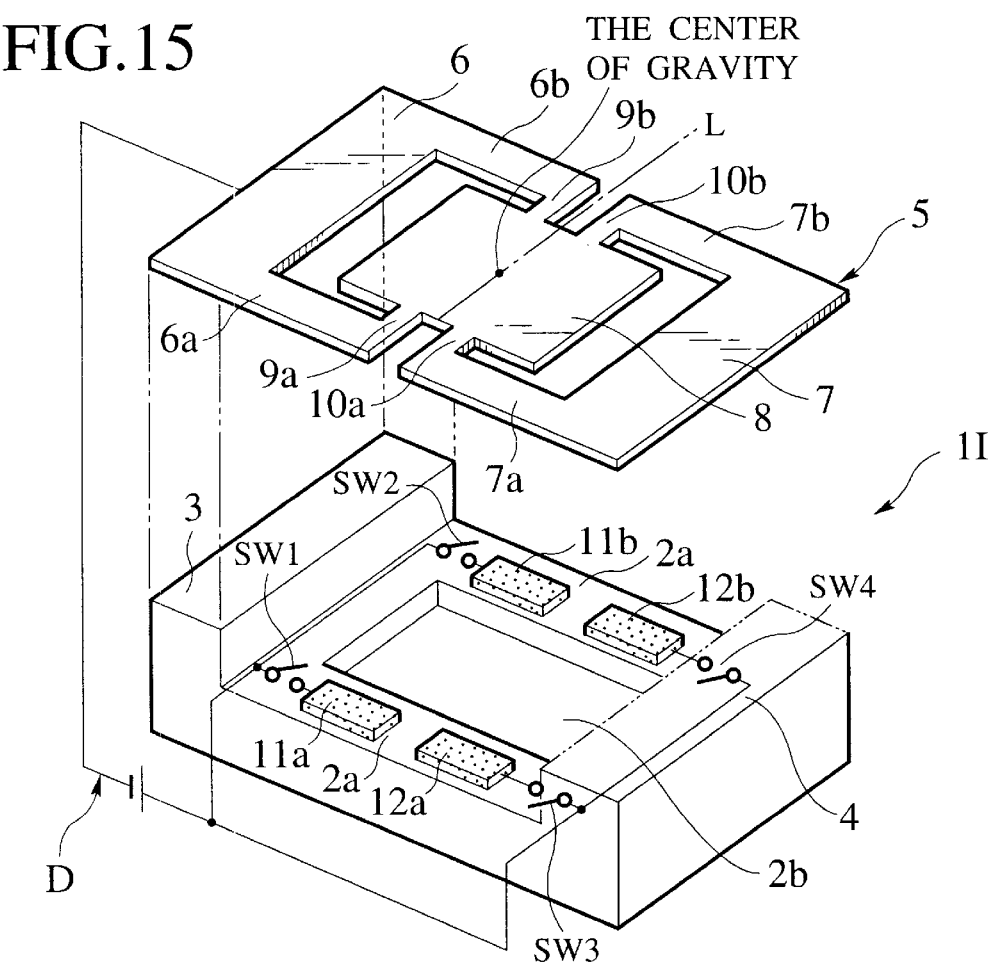
FIG. 15 is an exploded perspective view of a light deflection element according to the ninth embodiment of the present invention.
Figure 16:
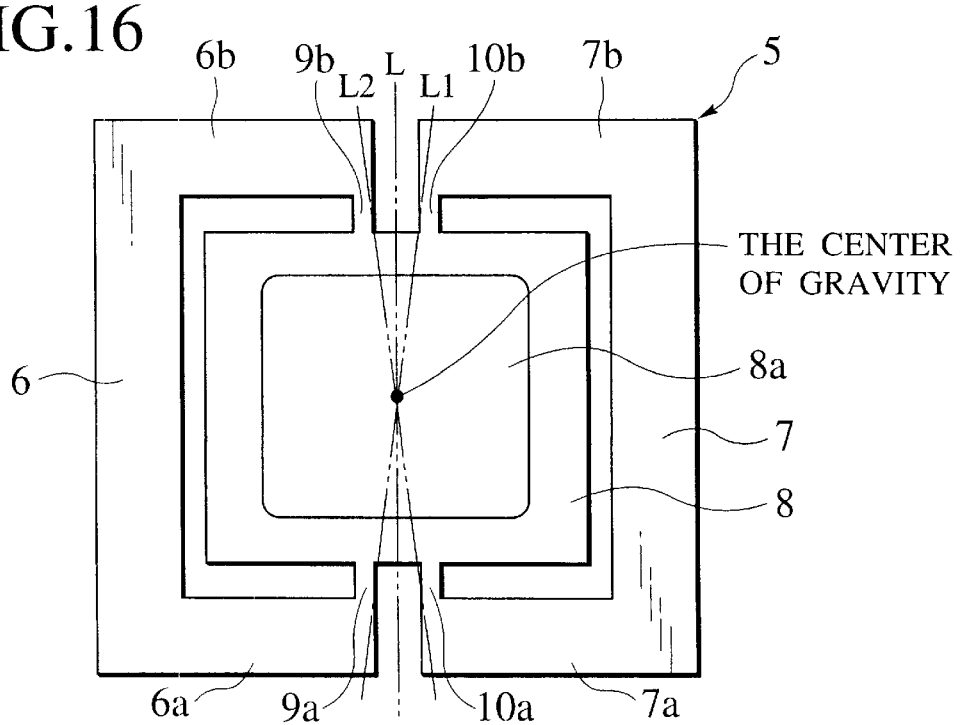
FIG. 16 is a plan view of an oscillating body according to the tenth embodiment of the present invention.

FIG. 15 and FIG. 16 show the ninth embodiment of the present invention, FIG. 15 being an exploded perspective view of a light deflection element 11, and FIG. 16 being a plan view of an oscillating body 5. In FIG. 15 and FIG. 16, the difference with respect to the first embodiment is only with regard to the configuration of the part of the drive apparatus D which applies a voltage. Specifically, in the ninth embodiment, four switches SW1 through SW4 are provided so as to enable the separate and independent application of a voltage to the electrodes 11a, 11b, 12a, and 12b, which correspond to the four arms 6a, 6b, 7a, and 7b of the pair or oscillating elements 6 and 7. The configuration is such that drive forces act separately and independently on the four arms 6a, 6b, 7a, and 7b, so that the inner ends of the four arms 6a, 6b, 7a, and 7b are separately and independently can be moved upward and downward. Because other elements of the configuration are the same as the first embodiment, they are assigned the same reference numerals and will not be explicitly described herein.

In the above-noted configuration, the switches SW1 and SW2 form one group and the switches SW3 and SW4 form another group, these two groups being alternately on/off controlled, so as to achieve the same action as described with regard to the first embodiment.

With the switches SW1 and SW4 in the off condition, by alternately on/off controlling the switches SW2 and SW3, drive force is applied to only the arms 6b and 7a, resulting in rotation about the rotational axis L1 shown in FIG. 16. With the switches SW2 and SW3 in the off condition, by alternately on/off controlling the switches SW1 and SW4, drive force is applied to only the arms 6a and 7b, resulting in rotation about the rotational axis L2 shown in FIG. 16. Thus, by changing the light deflection axis angle, it is possible to change the light deflection direction.

By enabling the above-noted change in the direction of light deflection, the following advantages as achieved. In the case, for example, in which the light deflection element is used in a barcode reader, by performing a one-dimensional scan it is possible to read information, but a reading error will result if the angle between the barcode and the scanner exceeds a given range. By using a light deflection element such as described above, however, whereby the direction of light deflection can be changed, it is possible to solve this problem of reading errors. In recent years, the increased amount of barcode information has resulted in the increased use of two-dimensional barcodes, with general CCD elements being used to read these barcodes. By using the above-noted light deflection element, however, which enables a change in the direction of light deflection, it is possible to read a two-dimensional barcode, thereby reducing the cost of scanning.

Additionally, by setting all the switches SW1 through SW4 to on simultaneously, the reflective mirror 8 moves downward in the horizontal attitude, the amount of movement being changeable in accordance with the applied voltage level. That is, by changing the position of the reflective mirror 8 in this manner, it is possible to adjust the focus of the optical system, for example. Having set all the switches SW1 through SW4 to on simultaneously, if a voltage is then superimposed so as to cause the reflective mirror 8 to vibrate, it is possible to vibrate the reflective mirror 8 at that position. Additionally, if the electrodes onto which the voltage is superimposed are the electrodes 11a and 12b or the electrodes 11b and 12a, these pairs being diagonally opposed to one another, it is possible to cause the reflective mirror 8 to vibrate with the angle of the light deflection axis changed. By setting all the switches SW1 through SW4 to on simultaneously and varying the voltage levels (including the zero level) between the switches SW1 and SW3 and the switches SW2 and SW4, it is possible to cause the reflective mirror 8 to be inclined, and superimposing a voltage that causes the reflective mirror 8 to vibrate in this condition enables a two-dimensional scan.

Figure 17:
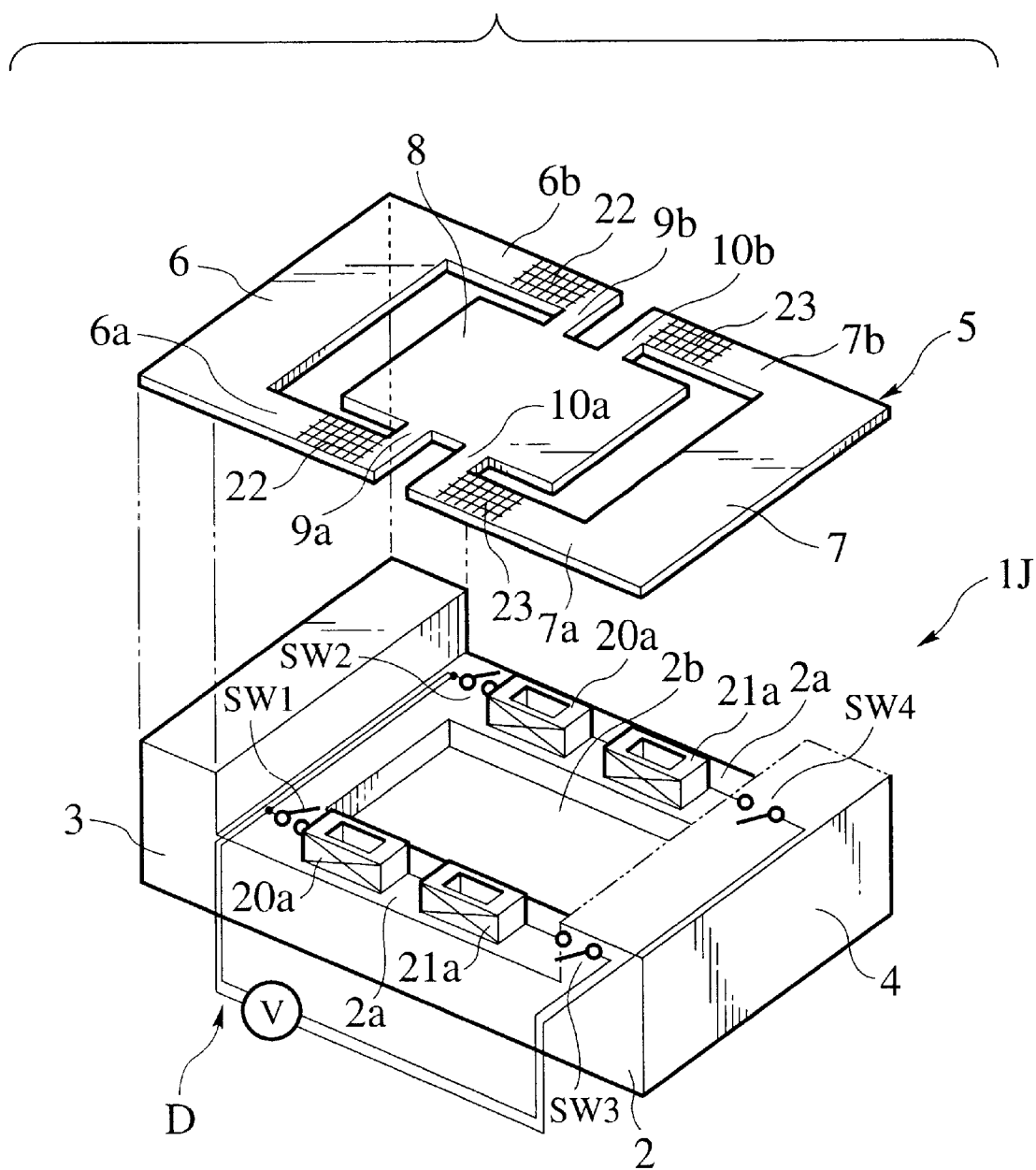
FIG. 17 is an exploded perspective view of the light deflection element according to the tenth embodiment of the present invention.

FIG. 17 is an exploded perspective view of a light deflection element 1J, showing the tenth embodiment of the present invention. In the tenth embodiment as shown in FIG. 17, the only difference with respect to the third embodiment is the configuration of the part of the drive apparatus D that causes a current to flow. That is, in the tenth embodiment, four switches SW1 through SW4 are provided to enable current to be passed separately and independently through each of drive coils 20a, 20b, 21a, and 21b, which correspond to the permanent magnets 22 and 23 of the arms 6a, 6b, 7a, and 7b of the pair of oscillating elements 6 and 7. The configuration is such that drive force acts separately and independently on the four arms 6a, 6b, 7a, and 7b, the inner ends of the arms 6a, 6b, 7a, and 7b being thereby separately and independently moved upward and downward. Other parts of the configuration are the same as the third embodiment, are assigned the same reference numerals, and are not described explicitly herein.

In this tenth embodiment as well, it is possible to change the direction of light deflection by changing the angle of the light deflection axis, and to adjust the focus, for example, by causing horizontal movement of the reflective mirror 8, in the same manner as is done in the ninth embodiment.

Figure 18:
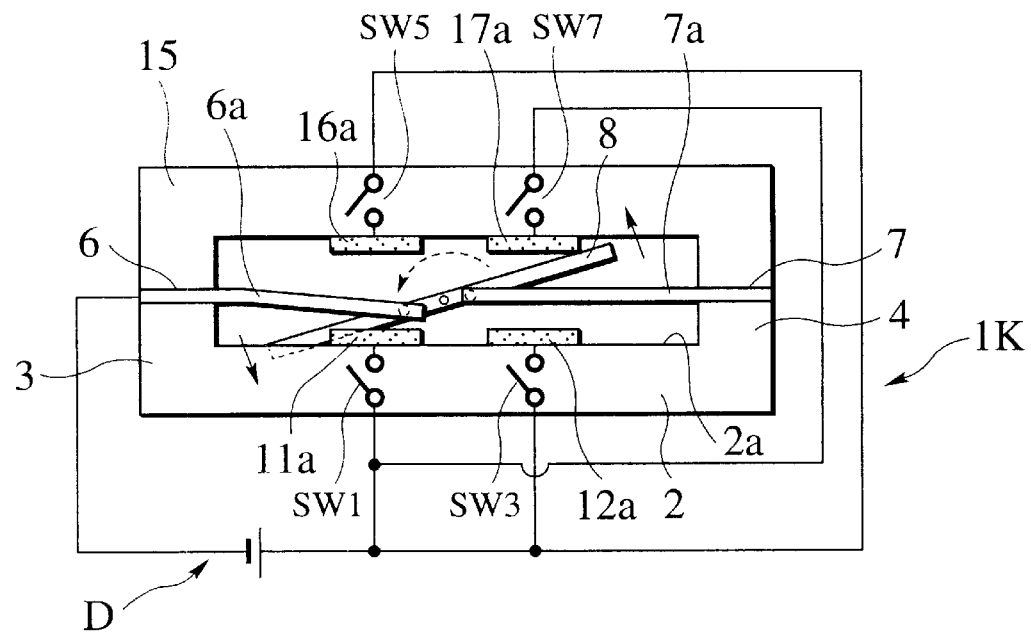
FIG. 18 is a side view of one side of the oscillating elements of the eleventh embodiment of the present invention.
Figure 19:
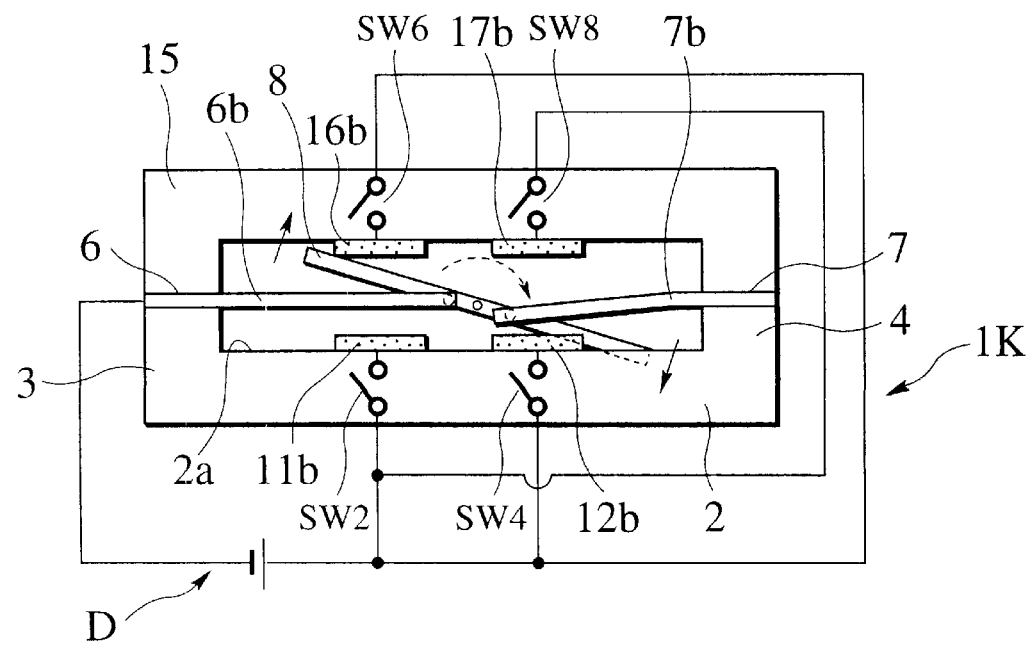
FIG. 19 is a side view of the other side of the oscillating elements of the eleventh embodiment of the present invention.

FIG. 18 and FIG. 19 shows the eleventh embodiment of the present invention. FIG. 18 being a side view of a light deflection element 1K, and FIG. 19 being a side view of the light deflection element 1K from a different side. In the eleventh embodiment as shown in FIG. 18 and FIG. 19 the only difference with respect to the third embodiment is the configuration of the part of the drive apparatus D that causes a voltage to be applied. Specifically, in the eleventh embodiment, eight switches, SW1 through SW8, are provided to enable the application of a voltage separately and independently to electrodes 11a, 11b, 12a, 12b, 16a, 16b, 17a, and 17b, which correspond to the four arms 6a, 6b, 7a, and 7b of the pair of oscillating elements 6 and 7. The configuration is such that a drive force acts separately and independently on the four arms 6a, 6b, 7a, and 7b, the inner ends of the arms 6a, 6b, 7a, and 7b being thereby separately and independently moved upward and downward. Other parts of the configuration are the same as the third embodiment, are assigned the same reference numerals, and are not described explicitly herein.

According to the eleventh embodiment, it is possible to change the direction of light deflection by changing the angle of the light deflection axis, and to adjust the focus, for example, by causing horizontal movement of the reflective mirror 8, in the same manner as is done in the ninth embodiment. Because by setting all the switches SW1 through SW8 to the on condition, it is possible to move the mirror upward as well in the horizontal attitude, it is possible to achieve a wide range of focus adjustment of an optical system. Additionally, for the same reason it is possible to greatly vary the angle of the light deflection axis, thereby enabling a large two-dimensional change in the light deflection direction.

Figure 20:
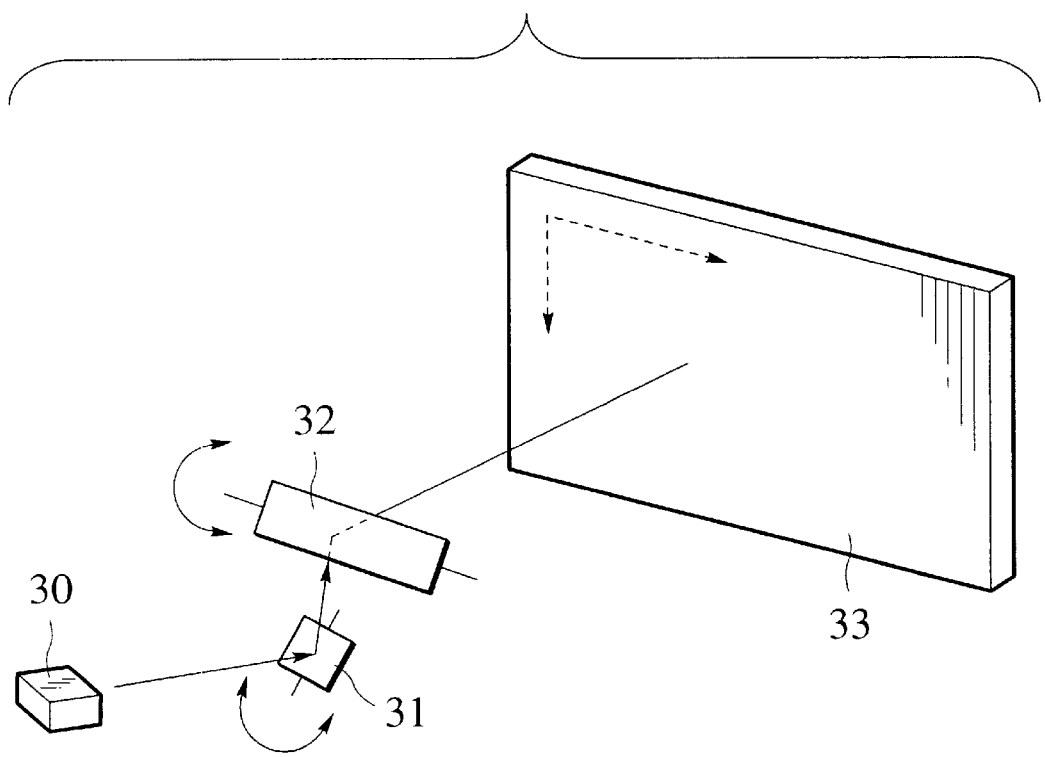
FIG. 20 is a simplified drawing showing the configuration of a display apparatus using a light deflection element according to the present invention.

FIG. 20 is a simplified drawing showing the configuration of a display apparatus using a light deflection element according to the present invention. As shown in FIG. 20, a laser beam that is emitted from a laser light source 30 is shone onto a horizontal scanning light deflection element 31. In the horizontal scanning light deflection element 31, a reflective mirror is vibrated by a drive apparatus in synchronization with a horizontal scanning frequency, this vibration being used to perform horizontal scanning. The reflected laser beam is then shone onto a vertical scanning light deflection element 32, at which a reflective mirror is vibrated by a drive apparatus in synchronization with a vertical scanning frequency, this vibration being used to perform vertical scanning. The thus reflected laser beam is shone onto a screen 33.

The above-described light deflection elements 1A through 1K are used as the horizontal scanning light deflection element 31, enabling high-speed vibration over a wide deflection angle, the result being the ability to vibrate in synchronization with a horizontal scanning frequency of several tens of kilohertz. The above-noted light deflection elements 1A through 1K can, of course, also be used as the vertical scanning light deflection element 32.

Figure 21:
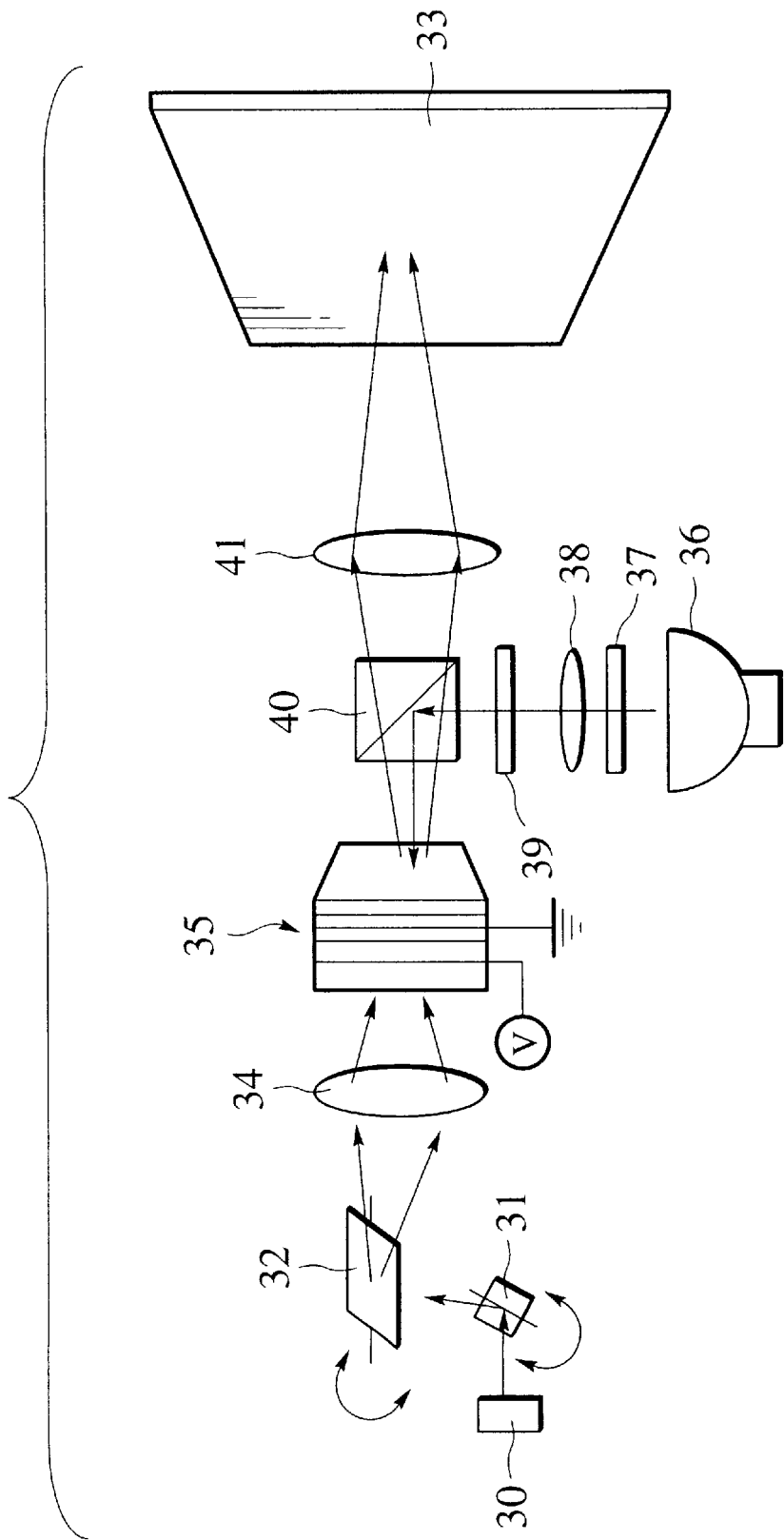
FIG. 21 is a simplified drawing showing the configuration of another display apparatus using a light deflection element according to the present invention.

FIG. 21 is simplified drawing showing the another display apparatus that uses the above-noted light deflection element 1A through 1K. In the display apparatus shown in FIG. 21, a laser beam that is emitted from a laser light source 30 is shone onto a horizontal scanning light deflection element 31. In the horizontal scanning light deflection element 31, a reflective mirror is vibrated by a drive apparatus in synchronization with a horizontal scanning frequency, this vibration being used to perform horizontal scanning. The reflected laser beam is then shone onto a vertical scanning light deflection element 32, at which a reflective mirror is vibrated by a drive apparatus in synchronization with a vertical scanning frequency, this vibration being used to perform vertical scanning. The thus reflected laser beam passes through a collimating lens 34 and is shone onto an optical address spatial modulator 35, whereby the light information is written. The associated surface luminance and intensity are amplified and display on a liquid crystal.

Light from a lamp 36 passes through an infrared-cutting filter 37, a lens 38, and a wavelength filter 39, after which it strikes a polarization beam splitter 40, the reflected light therefrom being shone onto the optical address spatial modulator 35. The light that is reflected by the optical address spatial modulator 35 is again caused to strike the polarization beam splitter 40, the light that passes therethrough being shone, via the lens 41, onto a screen 33.

The above-described light deflection elements 1A through 1K are used as the horizontal scanning light deflection element, thereby enabling both high speed and the achievement of a wide deflection angle, so that it is possible to cause vibration in synchronization with a horizontal scanning frequency of several tens of kilohertz. The above-noted light deflection elements 1A through 1K can, of course, also be used as the vertical scanning light deflection element 32.

According to the light deflection elements 1A through 1G of the first embodiment through the seventh embodiments, because it is sufficient that the drive apparatus D be configured so that a drive force acts separately and independently on the oscillating elements 6 and 7, there is a high degree of freedom provided in applying drive apparatuses of various configurations. Additionally because it is sufficient that the drive apparatus D be capable of causing a drive force to act separately and independently on the pair of oscillating elements 6 and 7, configurations other than those of the first embodiment through the seventh embodiment are also possible.

According the light deflection elements 1I through 1K of the ninth embodiment through the eleventh embodiment, because it is sufficient that the drive apparatus D be configured so that a drive force acts separately and independently on the four arms 6a, 6b, 7a, and 7b of the pair of oscillating elements 6 and 7, there is a high degree of freedom in applying drive apparatuses with a variety of configurations. Additionally, because it is sufficient that the drive apparatus D be capable of causing a drive force to act separately and independently on the four arms 6a, 6b, 7a, and 7b of the pair of oscillating elements 6 and 7, configurations other than those of the ninth embodiment through the eleventh embodiment are also possible.

In the first embodiment through the sixth embodiment and in the eighth embodiment through the eleventh embodiment, as shown in the application example for the seventh embodiment in FIG. 7, it the reflective mirror 8 is covered by a cover (not shown in the drawing) and placed in a vacuum, because there is no air resistance, it is possible to achieve a further increase in the speed of reflective mirror 8 vibration.

While the application example presented with regard to the above-described embodiments of the present invention is that of a display apparatus, it should be understood that the present invention is not restricted in this manner, and can of course be applied to the scanning apparatus of optical equipment, such as an electronic photocopier, a laser beam printer, or a barcode reader, and to a deflection apparatus of an optical disk tracking controller.

What is claimed is:

1. A light deflection element comprising:
   a first oscillating element having two arms and a pair of supports provided at a distance from one another, outer ends of the two arms being fixed to one of the pair of supports, and inner ends of the two arms being free ends;
   a second oscillating element having two arms, outer ends of which are fixed to the other of the pair of supports, and inner ends of which are free ends;
   a reflective mirror disposed between the two arms of each of the pair of oscillating elements;
   first torsion springs linking the inner ends of each of the arms of the first oscillating element to positions of the reflective mirror in proximity to and at a first position that is symmetrical about an axis that passes through the center of gravity of the reflective mirror;
   second torsion springs linking the inner ends of each of the arms of the second oscillating element to positions of the reflective mirror in proximity to and at a second position that is symmetrical about an axis that passes through the center of gravity of the reflective mirror; and
   a drive apparatus for applying drive to at least one of the pair of oscillating elements separately and independently, thereby causing the inner ends of the arms to move up and down separately and independently.

2. A light deflection element comprising:
   a first oscillating element having two arms and a pair of supports provided at a distance from one another, outer ends of the two arms being fixed to one of the pair of supports, and inner ends of the two arms being free ends;
   a second oscillating element having two arms, outer ends of which are fixed to the other of the pair of supports, and inner ends of which are free ends;
   a reflective mirror disposed between the two arms of each of the pair of oscillating elements;
   first torsion springs linking the inner ends of each of the arms of the first oscillating element to positions of the reflective mirror in proximity to and at a first position that is symmetrical about an axis that passes through the center of gravity of the reflective mirror;
   second torsion springs linking the inner ends of each of the arms of the second oscillating element to positions of the reflective mirror in proximity to and at a second position that is symmetrical about an axis that passes through the center of gravity of the reflective mirror; and
   a drive apparatus for applying drive force to four arms of the pair of oscillating elements, thereby causing the inner ends of the arms to move up and down separately and independently.

3. A light deflection element according to claim 1, wherein the drive apparatus applies a drive force to each of the inner ends of each oscillating element.

4. A light deflection element according to claim 2, wherein the drive apparatus applies a drive force to each of the inner ends of each oscillating element.

5. A light deflection element according to claim 1, wherein the drive apparatus is disposed at each support and applies a drive force to each of the outer ends of each oscillating element.

6. A light deflection element according to claim 1, wherein the drive apparatus is disposed at each support and applies a drive force to each oscillating element.

7. A display apparatus comprising a light deflection element, the light deflection element comprising:
   a first oscillating element having two arms and a pair of supports provided at a distance from one another, outer ends of the two arms being fixed to one of the pair of supports, and inner ends of the two arms being free ends;
   a second oscillating element having two arms, outer ends of which are fixed to the other of the pair of supports, and inner ends of which are free ends;
   a reflective mirror disposed between the two arms of each of the pair of oscillating elements;
   first torsion springs linking the inner ends of each of the arms of the first oscillating element to positions of the reflective mirror in proximity to and at a first position that is symmetrical about an axis that passes through the center of gravity of the reflective mirror;
   second torsion springs linking the inner ends of each of the arms of the second oscillating element to positions of the reflective mirror in proximity to and at a second position that is symmetrical about an axis that passes through the center of gravity of the reflective mirror; and
   a drive apparatus for applying drive force to at least one of the pair of oscillating elements separately and independently, thereby causing the inner ends of the arms to move up and down separately and independently,
   wherein a laser beam is shone onto the reflective mirror of the light deflection element, the direction of the laser beam reflected thereby being caused to change by changing the rotational angle of the reflective mirror using the drive apparatus, so as to obtain a projected image.

8. A display apparatus according to claim 7, further comprising an optical address spatial modulation element, wherein the light reflected from the reflective mirror is written by shining it onto an optical address spatial modulator, the light information written into the optical address spatial modulator being projected.

* * * * *